United States Patent
Golding et al.

(10) Patent No.: US 10,162,628 B2
(45) Date of Patent: Dec. 25, 2018

(54) TRANSACTIONAL DISTRIBUTED DATA ANALYSIS AND TRANSFORMATION

(71) Applicant: MICROSOFT TECHNOLOGY LICENSING LLC., Redmond, WA (US)

(72) Inventors: Laurence Jack Golding, Seattle, WA (US); Michael C. Fanning, Redmond, WA (US); Srivatsn Narayanan, Bothell, WA (US); Jinu Joseph, Woodinville, WA (US); Gen Lu, Redmond, WA (US); David Andrew Knise, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/382,426

(22) Filed: Dec. 16, 2016

(65) Prior Publication Data
US 2018/0173520 A1  Jun. 21, 2018

(51) Int. Cl.
*G06F 9/44* (2018.01)
*G06F 8/71* (2018.01)
*G06F 9/54* (2006.01)

(52) U.S. Cl.
CPC ............ *G06F 8/71* (2013.01); *G06F 9/542* (2013.01)

(58) Field of Classification Search
CPC ... G06F 8/71; G06F 8/73; G06F 9/542; G06F 9/543
USPC ................... 717/101–103, 120–123
See application file for complete search history.

(56) References Cited

U.S. PATENT DOCUMENTS

| | | | |
|---|---|---|---|
| 5,778,368 A | 7/1998 | Hogan et al. | |
| 8,271,461 B2 * | 9/2012 | Pike | G06Q 10/10 707/695 |
| 8,312,430 B2 | 11/2012 | Best et al. | |
| 8,321,834 B2 | 11/2012 | Baker et al. | |
| 8,352,919 B2 | 1/2013 | Misch et al. | |
| 8,689,179 B2 | 4/2014 | Remmel et al. | |
| 8,701,084 B1 | 4/2014 | MacDonald | |
| 8,713,554 B1 | 4/2014 | Chopra et al. | |
| 8,856,725 B1 * | 10/2014 | Anderson | G06F 8/75 717/103 |
| 9,052,966 B1 | 6/2015 | Quinlan | |
| 9,141,378 B2 | 9/2015 | Fox et al. | |
| 9,256,425 B2 | 2/2016 | Baird et al. | |
| 9,378,242 B1 | 6/2016 | Fontenot et al. | |

(Continued)

OTHER PUBLICATIONS

Rational Unified Process, "Activity: Establish Change Control Process", 2001, Rational Software Corporation, retrieved from http://sce.uhcl.edu/helm/rationalunifiedprocess/process/activity/ac_epcmp.htm , 6 pages.*

(Continued)

*Primary Examiner* — Ted T. Vo (57) ABSTRACT

A data analysis and transformation engine provides a service that automatically analyzes, formats, and/or reviews changes made to collection of artifacts stored in one or more source control systems in accordance with a user's instructions in a coordinated manner. A user subscribes to the data analysis and transformation engine with instructions on the user's preference for formatting, reviewing, and analyzing an artifact after the artifact was modified and checked into a source control system.

20 Claims, 10 Drawing Sheets

(56) References Cited

U.S. PATENT DOCUMENTS

| | | | |
|---|---|---|---|
| 9,697,106 B1* | 7/2017 | Leong | G06F 11/3668 |
| 9,703,554 B2* | 7/2017 | Eberlein | G06F 8/73 |
| 2004/0122791 A1 | 6/2004 | Sea et al. | |
| 2008/0229290 A1 | 9/2008 | Jones et al. | |
| 2013/0232452 A1 | 9/2013 | Krajec et al. | |
| 2014/0351788 A1 | 11/2014 | Bienkowski et al. | |
| 2015/0089478 A1 | 3/2015 | Cheluvaraju et al. | |

OTHER PUBLICATIONS

Rational Unified Process, "Artifact: Change Request", 2001, Rational Software Corporation, retrieved from http://sce.uhcl.edu/helm/rationalunifiedprocess/process/artifact/ar_crqst.htm , 6 pages.*

Szoke, et al., "FaultBuster: An automatic code smell refactoring toolset", In Proceedings of IEEE 15th International Working Conference on Source Code Analysis and Manipulation, Sep. 27, 2015, pp. 253-258.

"CodeIt.Right Features", Retrieved on: Aug. 8, 2016 Available at: http://submain.com/codeit.right/features.aspx190 1.

Griffith, et al., "Evolution of Legacy System Comprehensibility through Automated Refactoring", In Proceedings of the International Workshop on Machine Learning Technologies in Software Engineering, Nov. 12, 2011, pp. 35-42.

Allamanis, et al., "Learning natural coding conventions", In Proceedings of the 22nd ACM SIGSOFT International Symposium on Foundations of Software Engineering, Nov. 16, 2014, pp. 281-293.

Hanselman, Scott, VS Refactoring Essentials (formerly) NR6Pack—Free analyzers and refactoring for Visual Studio 2015, Published on: Jul. 8, 2015 Available at: http://www.hanselman.com/blog/VSRefactoringEssentialsFormerlyNR6PackFreeAnalyzersAndRefactoringForVisualStudio2015.aspx.

Massoni, et al., "A model-driven approach to formal refactoring", In Proceedings of 20th annual ACM SIGPLAN conference on Object-oriented programming, systems, languages, and applications, Oct. 16, 2005, pp. 124-125.

Iqbal, Muhammad Aftab., "Large scale data integration of OSS repositories for automated soft and technical factors assessment", In Doctoral Dissertation of National University of Ireland, Apr. 22, 2015, 241 pages.

Franklin, et al., "LambdaFicator: From imperative to functional programming through automated refactoring", In Proceedings of 35th International Conference on Software Engineering, May 18, 2013, pp. 1287-1290.

Lewis, et al., "Microservices", Published on: Mar. 25, 2014, pp. 16, Available at: http://martinfowler.com/articles/microservices.html.

Aubry, Antoine, "YamlDotNet is a .NET library for YAML", Retrieved on: Aug. 17, 2016, pp. 6, Available at: https://github.com/aaubry/YamlDotNet.

Torgersen, "Welcome to the .NET Compiler Platform ("Roslyn")", Retrieved on: Aug. 17, 2016, pp. 2, Available at: https://github.com/dotnet/roslyn/blob/master/README.md.

Alekseyts, "The .NET Compiler Platform ("Roslyn") provides open-source C# and Visual Basic compilers with rich code analysis APIs", Retrieved on: Aug. 17, 2016, pp. 3, Available at: https://github.com/dotnet/roslyn.

"Titan Distributed Graph Database", Retrieved on: Aug. 17, 2016, pp. 2, Available at: http://titan.thinkaurelius.com/.

"Titan", Retrieved on: Aug. 17, 2016, pp. 1, Available at: https://github.com/thinkaurelius/titan/wiki.

"RexPro", Retrieved on: Aug. 17, 2016, pp. 3, Available at: https://github.com/tinkerpop/rexster/wiki/RexPro.

Shao, et al., "Graph Engine"Retrieved on: Aug. 17, 2016, pp. 3, Available at: https://www.microsoft.com/en-us/research/project/graph-engine/.

"CodeIt.Right Features", Published on: Dec. 4, 2014, pp. 3, Available at: http://submain.com/codeit.right/features.aspx#.1.

Potvin, et al., "Why Google Stores Billions of Lines of Code in a Single Repository", In Journal of Communications of the ACM, vol. 59, Issue 7, Jul. 2016, 11 pages.

* cited by examiner

TRANSACTIONAL DISTRIBUTED DATA ANALYSIS AND TRANSFORMATION

BACKGROUND

Field

The present embodiments relate to techniques for analyzing, annotating, transforming, and reviewing artifacts on computing systems and more particularly, to methods, devices, and systems for automatically analyzing changes made to artifacts in source controlled repositories and effecting formatting, review and analysis of those changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A data analysis and transformation engine provides a service that automatically analyzes, formats, and/or reviews changes made to a collection of artifacts stored in one or more source controlled repositories or repositories in accordance with a user's instructions in a coordinated manner. A source controlled repository is managed by a source control system. A user subscribes to the data analysis and transformation engine with instructions on the user's preference for formatting an artifact (e.g., source code, configuration settings, etc.) after the artifact was modified and checked into a source controlled repository. The artifact may also be analyzed for conditions such as, without limitation, security flaws, logic errors, and/or syntax errors which are reported for one or more users to amend with suggested corrections. The changes made to an artifact may be reviewed by one or more reviewers to solicit confirmation of a suggested change or to elicit additional formatting or analysis for the artifact.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Programmers (i.e., developers, users, end users, etc.) often utilize a source controlled repository to store source code and other programming artifacts that can be shared among different programmers. A programming artifact is a file that is produced from a programming activity, such as source code, program configuration data, documentation, and the like. A source control system or version control system typically stores each version of the programming artifact and tracks the changes or differences between the different versions. Repositories managed by source control systems are distributed so that each user of the repository has a working copy of the repository. The source control system coordinates the distribution of the changes made to the contents of the repository to the different users.

The source control system is often implemented as a cloud or web service that is accessible to various programmers through online transactions over a network. An online transaction or transaction is an individual, indivisible operation performed between two networked machines. A programmer may check out an artifact, such as a source code file, and edit a copy of the file in its local machine. When the user is finished with editing the source code file, the user performs a commit which checks in the modified version of the source code file into the source controlled repository. The process of checking out an artifact and checking in the artifact is performed through online transactions over a network. These online transactions are performed concurrently while other programmers are possibly accessing the same artifact.

The continual access of the different artifacts by different programmers working on the same programming project may at times be uncoordinated resulting in source code developed using different coding styles that differ from a project's coding standard, may contain erroneous conditions, such as security flaws, logic errors, and/or syntax errors, and may include changes having been made without code review or consensus of the project's team leaders.

The subject matter disclosed herein provides a user with a service that performs user-defined actions automatically on previously committed artifacts in source control systems. These user-defined actions are used to automatically format one or more artifacts to a preferred format, automatically analyze one or more artifacts for conditions such as, security flaws, logic errors and/or syntax errors and report the results of the analysis possibly with suggested corrections, and/or automatically initiate review of the changes made to one or more artifacts. These user-defined actions are performed by a service separate from the user's machine and separate from the source control system.

The format of an artifact may need to conform to a formatting standard that dictates the placement of tabs or spaces used for indentations, the number of blank lines left between lines of functional code, the placement of curly braces "{", and the like. This automatic code formatting may be set by the author of the source code file or by a group administrator associated with a project that utilizes the modified source code file. In this manner, all the artifacts conform to the same formatting style and do not rely on the developer to adhere to the standard.

An analysis of the artifact may be made after a user has modified the artifact in order to determine if the changes introduced potential erroneous conditions, such as, without limitation, security flaws, logic errors, and/or syntax errors. The artifact may be analyzed by a compiler, syntax analysis tool, or another analysis tool to detect these conditions. These conditions may be identified in a report that is output to one or more users. The report may suggest changes that may be made to correct these conditions which the user may readily perform.

A user may specify that one or more artifacts are to undergo review by one or more reviewers. The data analysis and transformation service initiates this review and invites one or more reviewers to participate. This review is performed after the data analysis and transformation service has performed its analysis and formatting actions. The reviewers may perform the review after the formatting and analysis actions are complete. In case where the formatting and analysis actions run for a long time, reviewers may perform the review while those actions are still in progress.

By providing these services separate from the source control system, a user who has artifacts stored in different source control systems can coordinate the changes made to a collection of artifacts in the different source control systems more efficiently from a central service. In addition, the services provided by the data analysis and transformation engine can operate with any source control system without regard to the capabilities of a particular source control system.

Transactional Distributed Data Analysis and Transformation

Figure 1:
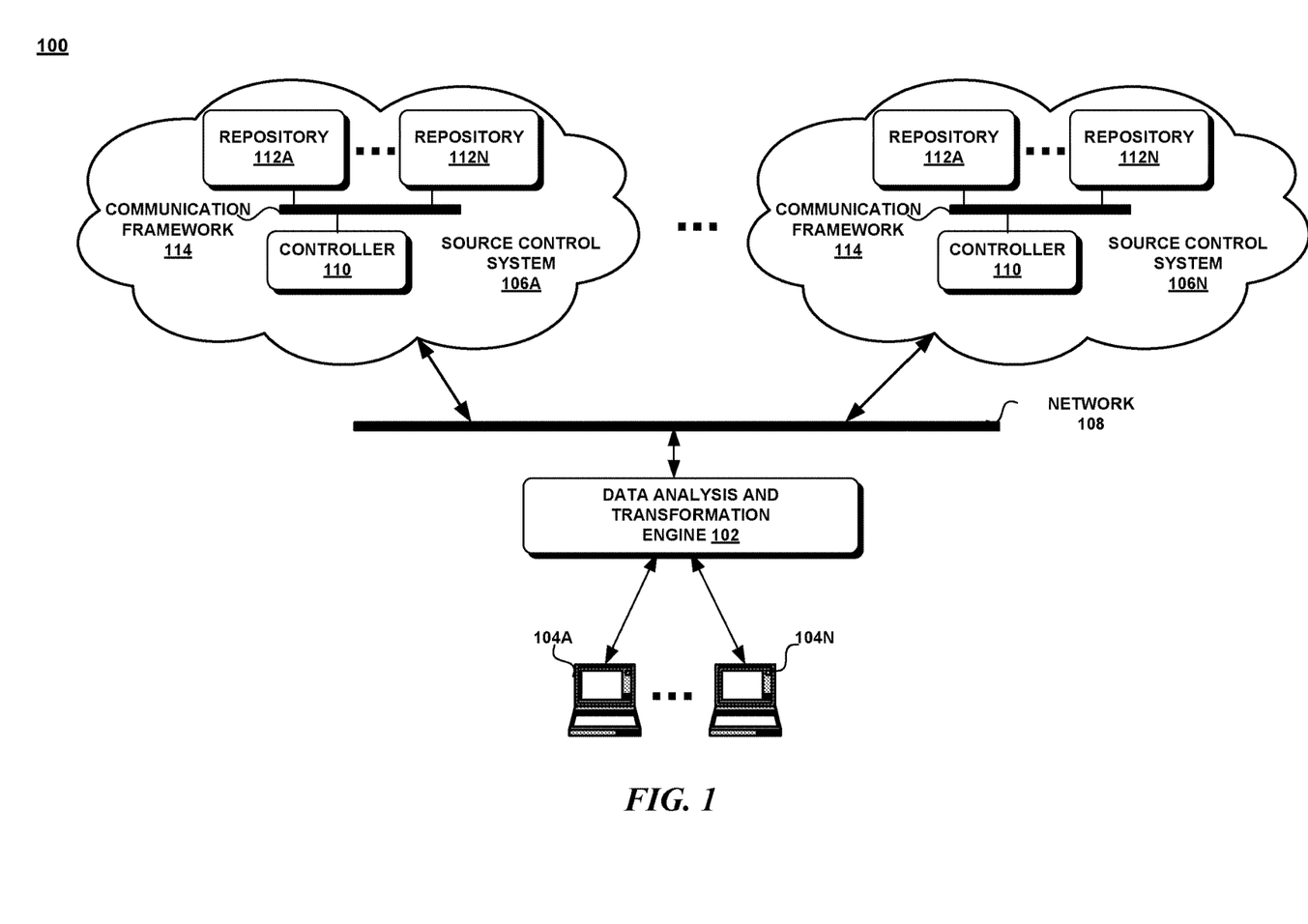
FIG. 1 is a block diagram illustrating exemplary components of a system for the analysis, transformation, and review of artifacts stored in one or more repositories.

Attention now turns to FIG. 1 for a description of an exemplary configuration of a system 100 for transactional distributed data analysis and transformation services. In one aspect of the subject matter disclosed herein, the system 100 includes a data analysis and transformation engine 102, one or more user or client machines 104A-N (collectively and individually 104), and one or more source control systems 106A-N (collectively and individually 106). The data analysis and transformation engine 102 may be configured to communicate with users (e.g., developers, programmers, end users, clients, etc.) through one or more user or client machines 104 as a service that interfaces with any one or more of the source control systems 106. The data analysis and transformation engine 102 receives requests from the users 104 indicating when and how certain artifacts in the source control system 106 are to be analyzed, reviewed, and/or transformed or formatted.

The data analysis and transformation engine 102 is in communication with one or more source control systems 106 through a network 108. A source control system 106 may include a controller 110 coupled to one or more repositories 112A-112N (collectively and individually "112") through a communication framework 114. The communications between the data analysis and transformation engine 102 and the source control system 106 may involve a two-way information exchange in a session that utilizes a stateful or stateless communication protocol. In a stateless session, each communication is considered an independent event that is unrelated to another communications. In a stateful session, parts of the session state are retained across different communications.

The source control system 106 may communicate with other devices or users (not shown) than the data analysis and transformation engine 102. The source control system 106 controls access to artifacts stored in the service 106 by different client machines. Any type of source control system 106 may be used, such as without limitation, Git, Mercurial, Bazaar, Dares, Subversion, Microsoft Team Foundation Server Version Control, etc. In one aspect, artifacts may be stored in a single source control system, while in other aspects, artifacts may be stored in multiple source control systems, possibly of different types. Any given artifact is stored in exactly one repository, which is managed by exactly one source control system.

Figure 2:
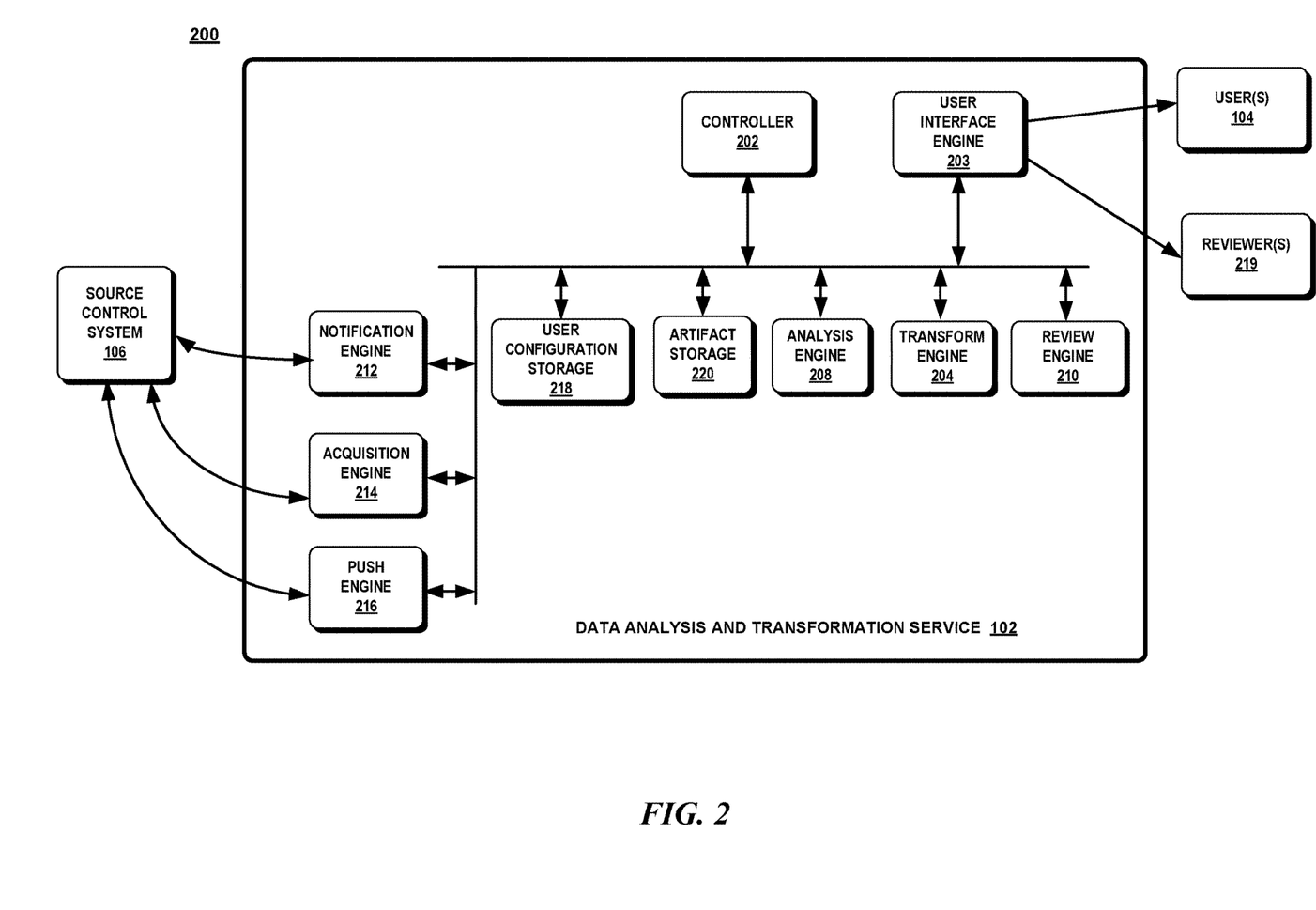
FIG. 2 is a block diagram illustrating exemplary components of the data analysis and transformation engine.

FIG. 2 illustrates an exemplary system 200 of the components of the data analysis and transformation engine 102 in further detail. As shown in FIG. 2, the data analysis and transformation engine 102 includes a controller 202, a user interface engine 203, a transform engine 204, an analysis engine 208, a review engine 210, a notification engine 212, an acquisition engine 214, a push engine 216, a user configuration storage 218, and an artifact storage 220. These components may be implemented as a sequence of computer program instructions, that when executed by a processor, causes the processor to perform methods and/or operations in accordance with a prescribed task. These components may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language. These components may be implemented as threads that execute concurrently within a single process. A process is an instance of an application that is configured with the resources needed to execute it. A thread is an independent execution unit that executes a subset of the application's instructions or code.

A user 104 may interact with the user interface engine 203 to subscribe to the services of the data analysis and transformation engine 102. The user interface engine 203 generates a user configuration 218 for each subscribed user that details the actions or services requested by a user which is stored in user configuration storage 218. The controller 202 informs the notification engine 212 of the events that trigger the actions requested by the user. The notification engine 212 subscribes to one or more source control systems 106 for notification of these events.

Upon receipt of a notification of a subscribed event from a source control system 106, the notification engine 212 notifies the controller 202. The controller 202 instructs the acquisition engine 214 to obtain the changed artifacts from a source control system 106 which are then stored in the artifact storage 220. The acquisition engine 214 notifies the controller 202 when the artifacts have been acquired. The controller 202 then instructs either of the transform engine 204, the analysis engine 208, and/or the review engine 210 to perform the tasks associated with the event. Upon completion of these tasks, the controller 202 notifies the push engine 216 to commit the modified artifacts back to one or more of the source control systems 106.

A user instructs the data analysis and transformation service 102 to perform one or more actions on one or more artifacts in one or more particular source control systems 106 either through a graphical user interface (GUI) or through a configuration file. The graphical user interface (GUI) may have a series of menus, icons, and visual indicators that assists the user in specifying its instructions. The GUI may be accessible through a web browser or through an application, such as a desktop application. Alternatively, the instructions may be input through a configuration file, such as, without limitation, a hypertext markup language (HTML), extensible markup language (XML), JavaScript Object Notation (JSON), etc. or a combination of a GUI and a configuration file. It should be noted that the subject matter disclosed herein is not limited to a particular input format and that other mechanisms may be utilized to convey the user's instructions.

Figure 3:
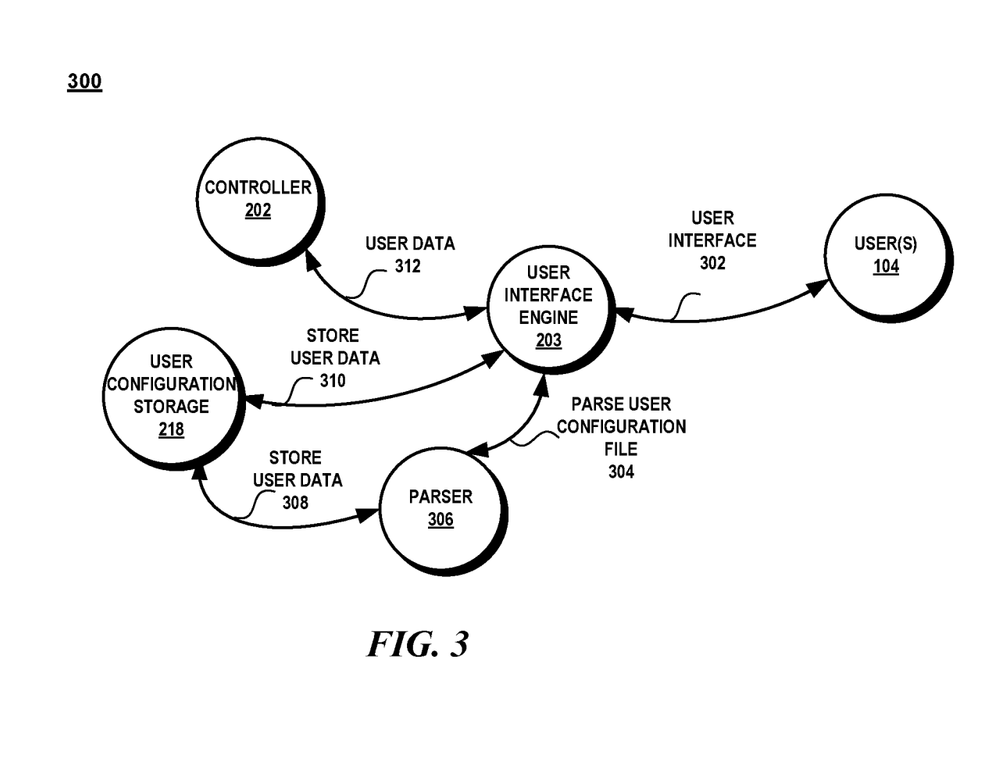
FIG. 3 is a diagram illustrating exemplary actions of the user interface engine.

Referring to FIG. 3, there is shown an exemplary operation of the user interface engine 203. The user interface engine 203 interacts with a user 104 through a user interface 302. The user interface 302 contains a GUI that assists the user in inputting the user instructions through a series of menus, icons, buttons, and other graphical objects. The input obtained through the GUI is then stored as user data (line 310) in the user configuration storage 218. Alternatively, the user interface 302 accepts configuration files which are then parsed by a parser 306 into user data (line 304) that are stored 308 in the user configuration storage 218. The user interface engine 203 passes the user data to the controller 202 for further processing.

Source code that is developed in a collaborative project with several developers often has to adhere to certain coding standards or project style guidelines. These coding standards or project style guidelines indicate the manner in which the source code is to be formatted. The use of coding standards and project style guidelines ensure that a consistent formatting style is used across the code base. The formatting style may specify the manner in which comments are made to the program, indentations, hiding text, displaying URLs, convert white spaces to tabs, converting upper case letters to lower case letters and vice versa, number of blank lines between code segments, number of blank spaces between code elements, layout of the source code, and so forth. The formatting style may be predefined and stored in the data analysis and transformation engine as a set of rules that are identified by a particular identifier.

Figure 4:
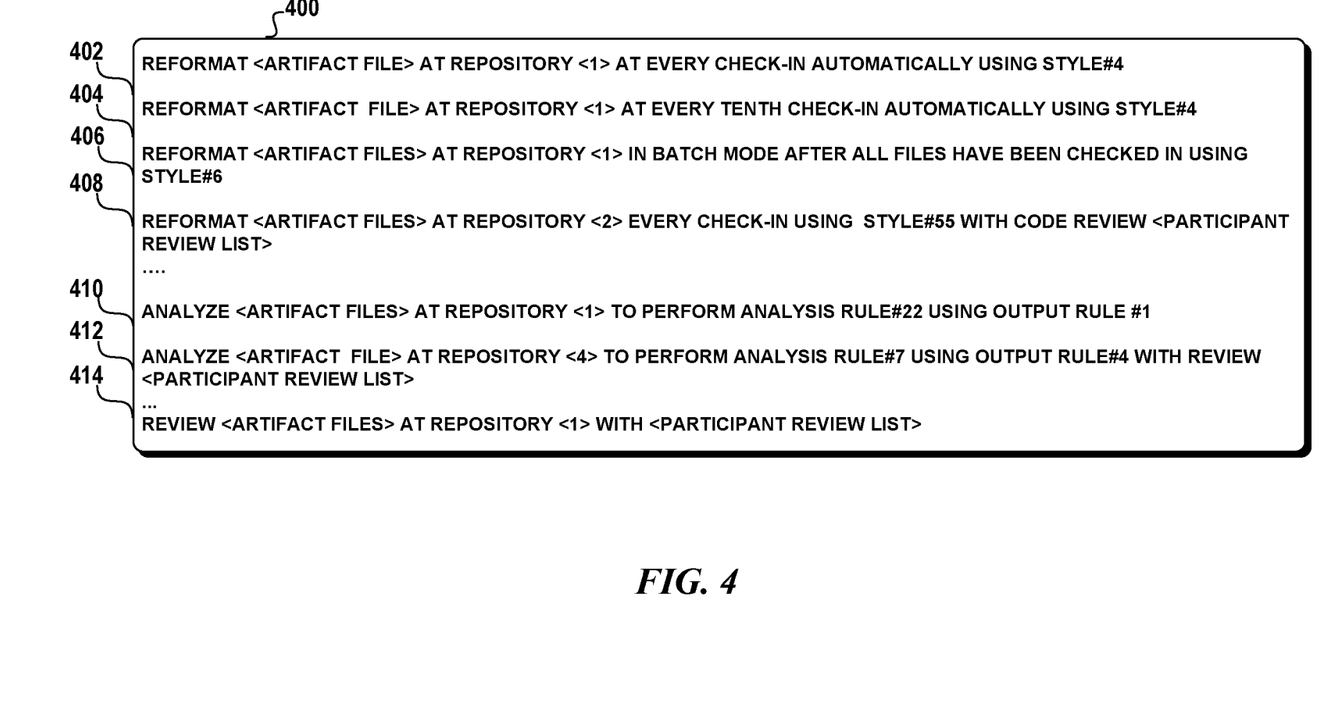
FIG. 4 is a diagram illustrating exemplary user instructions.

In one aspect, the user's instructions may specify the format style, the frequency that the reformatting is to be performed, the files that are reformatted, the events that trigger the automatic reformatting, the repositories where the artifact files reside, and whether review of the artifacts is required. Turning to FIG. 4, there is shown an exemplary user instruction file 400. The exemplary user instruction file 400 may include user instruction 402 which is shown as "REFORMAT <ARTIFACT FILE> AT REPOSITORY <1> AT EVERY CHECK-IN AUTOMATICALLY USING STYLE #4". This user instruction 402 indicates that the artifact file identified by <ARTIFACT FILE> in repository 1 is to be reformatted whenever this artifact file is checked into repository 1 automatically and reformatted using a particular collection of formatting rules identified as style #4. The formatting style, such as "style #4" represents a particular collection of formatting rules. The term "automatically" in this user instruction indicates that there is no code review. The event in the source control system that triggers this instruction is when the <ARTIFACT FILE> is checked in.

Likewise, user instruction 404 "REFORMAT <ARTIFACT FILE> AT REPOSITORY <1> AT EVERY TENTH CHECK-IN AUTOMATICALLY USING STYLE #4" indicates that the artifact file identified by <ARTIFACT FILE> in repository 1 is to be reformatted at the tenth check-in automatically, without code review, using style#4. Style#4 is a particular collection of formatting rules. The event that triggers this instruction is the tenth check-in of the <ARTIFACT FILE>.

The user instruction 406, "REFORMAT <ARTIFACT FILES> AT REPOSITORY <1> IN BATCH MODE AFTER ALL FILES HAVE BEEN CHECKED IN USING STYLE #6" indicates a batch mode instruction. A batch mode instruction indicates that a group of artifact files are to be reformatted at once. In user instruction 406, the artifact files are reformatted using style #6 after all the files have been checked in. Style #6 is a particular collection of formatting rules. The event in the source control system that triggers this instruction is when all the <ARTIFACT FILES> in repository 1 have been checked in.

The user instruction 408, "REFORMAT <ARTIFACT FILES> AT REPOSITORY <2> EVERY CHECK-IN USING STYLE #55 WITH CODE REVIEW <PARTICIPANT REVIEW LIST>" indicates that the group of files listed in <ARTIFACT FILES> in repository 2 are to be reformatted at every check-in using style 55. The instruction "WITH CODE REVIEW <PARTICIPANT REVIEW LIST> indicates that the formatting is to be reviewed by the users listed in the participant review list. The event in the source control system that triggers this instruction is when the files specified in <ARTIFACT FILES> are checked into the repository. Style #55 is a particular collection of formatting rules.

An artifact, such as a source code file, adheres to the grammar of the underlying programming language the source code program is written in. At times changes made to one or more files may be checked into the source control system without having been screened for syntax errors. A user may request that the source control system analyze one or more source code files for syntax errors. In this situation, the data analysis and transformation engine executes a syntax checking tool, such as an interpreter, compiler, or other static syntax application to analyze the artifact for compliance with the syntax of a grammar or for compliance with a set of syntax rules.

In addition, changes made to an artifact may be analyzed for security flaws and/or logic errors. A security flaw is vulnerability in a system that has the potential for an attack against the system. For example, a security flaw may be attributable to changes made to a configuration file (i.e., artifact) that may expose a system configured with the configuration file to be susceptible to malware attacks. A logic error is a mistake in a program that causes the program to operate incorrectly. A user may request that the data analysis and transformation service analyze one or more source code files for security flaws and logic errors as well as syntax errors.

Referring to FIG. 4, the exemplary user instruction file 400 may include a user instruction 410 which is shown as "ANALYZE <ARTIFACT FILES> AT REPOSITORY <1> TO PERFORM ANALYSIS RULE #22 USING OUTPUT RULE #1." This user instruction 410 instructs the data analysis and transformation engine to analyze the files indicated in <ARTIFACT FILES> at repository 1 to perform the actions indicated in analysis rule #22 and to generate the output of that analysis in accordance with output rule #1. Analysis rule #22 is a collection of rules that indicate the analysis actions that are to be performed, such a syntax check, etc. Output rule #1 represents a collection of rules that indicate how the output of the analysis is be generated. The event that triggers this user instruction is when the files indicated in <ARTIFACT FILES> are checked into the repository.

The exemplary user instruction file 400 may also include a user instruction 412 which is shown as "ANALYZE <ARTIFACT FILE> AT REPOSITORY <4> TO PERFORM ANALYSIS RULE #7 USING OUTPUT RULE #4 WITH REVIEW <PARTICIPANT REVIEW LIST>". This user instruction 412 instructs the data analysis and transformation engine to analyze the file listed in <ARTIFACT FILE> in repository 4 in accordance with the set of rules denoted as analysis rule #22 and to generate the output of that analysis in accordance with set of rules identified as rule #4 where the output of the analysis is to be reviewed by the users indicated in the <PARTICIPANT REVIEW LIST>.

Figure 5:
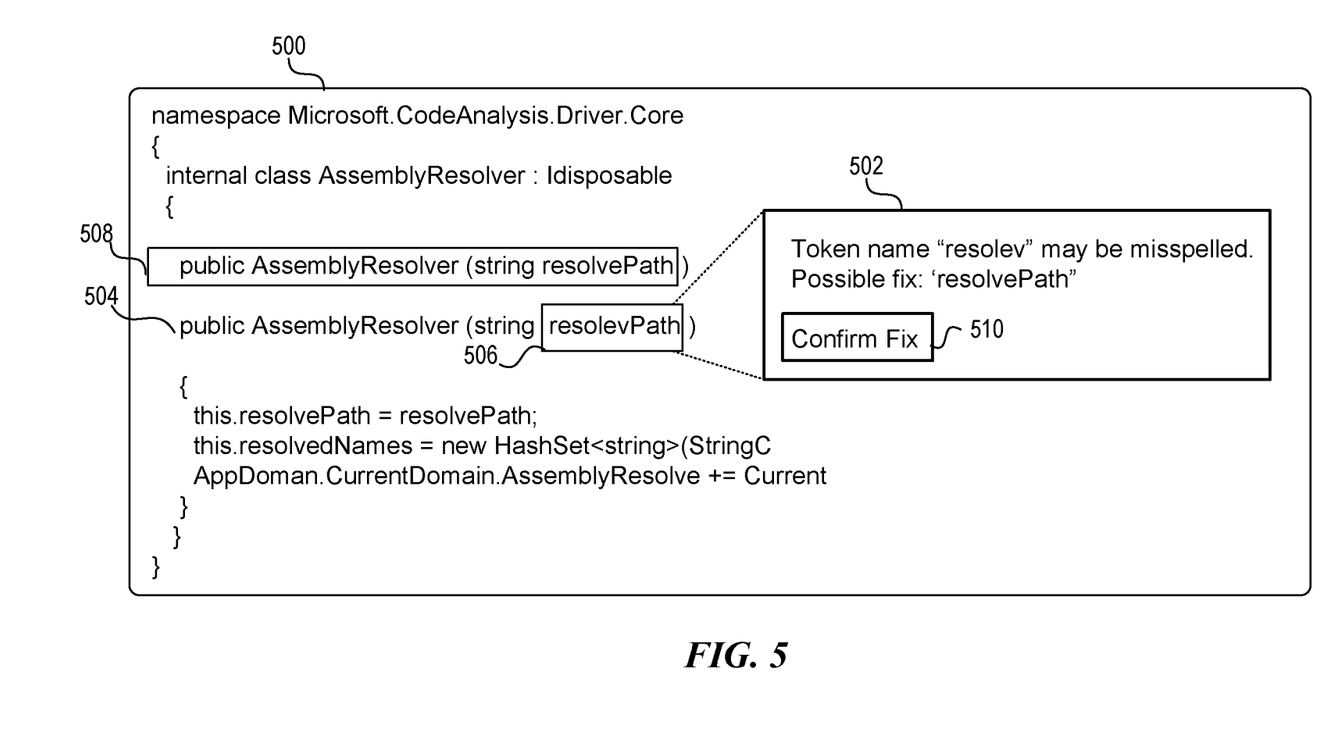
FIG. 5 illustrates an exemplary report output from the data analysis and transformation engine.

The output of this analysis may be presented to a user in any one of a number of different forms. In one aspect, an artifact, such as source code, may be supplemented with annotations that indicate the nature of a potential erroneous condition, such as a security flaw, logic error and/or syntax error with automatically generated suggestions on how to fix the error. For example, turning to FIG. 5, there is shown a report 500 from an analysis of a source code file generated by the analysis engine and displayed in a GUI by the user interface engine. The report 500 shows the source code file annotated with a box 502 indicating a possible error on line 504 in the source code file. The error is highlighted in box 506. The report shows in line 508 the corrected source code statement. The annotation 502 includes an option for the user or reviewer to correct a possible error using the "Confirm Fix" button 510. When the "Confirm Fix" button is activated 510, the user interface engine accepts the change and stores the altered artifact in the artifact storage.

Code review is peer review of a source code file for mistakes ignored or missed by the author of the source code or the developer who made changes to the file. Code review is beneficial for catching mistakes before the code is released for general distribution. A user of the data analysis and transformation service may request that certain artifacts undergo a review process, such as a code review, and indicate which users are to participate in the review. The review process may be performed in combination with an analysis action and/or a transformation action.

Referring to FIG. 4, there is shown a user instruction 414 which is shown as "REVIEW <ARTIFACT FILES> AT REPOSITORY <1> WITH <PARTICIPANT REVIEW LIST>." This user instruction 414 indicates that the artifact files listed in <ARTIFACT FILES> in repository 1 are to undergo a review process with the users listed in <PARTICIPANT REVIEW LIST>. This review process is triggered when the named artifact files in repository 1 are checked into the source control system. It should be noted that the review process may be a single action or part of other user actions, such as what is shown in user instructions 408 and 412.

Attention now turns to a description of the operations for an aspect of the subject matter described with reference to exemplary methods. It may be appreciated that the representative methods do not necessarily have to be executed in the order presented, or in any particular order, unless otherwise indicated. The exemplary methods may be representative of some or all of the operations executed by one or more aspects described herein and that the method can include more or less operations than that which is described. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints.

Figure 6:
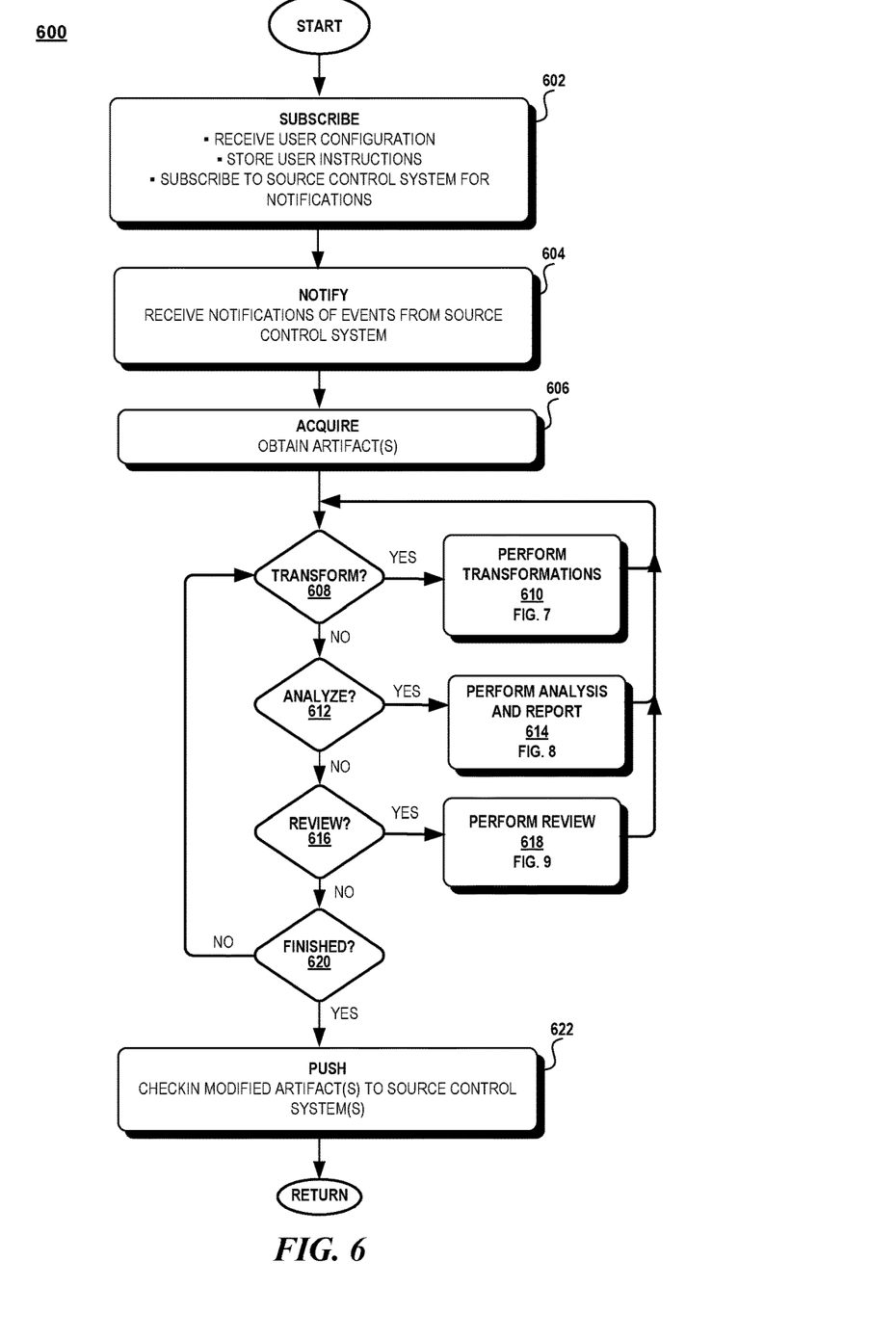
FIG. 6 is a flow diagram of an exemplary method of the data analysis and transformation engine.

Turning to FIG. 6, there is shown an exemplary method 600 of the data analysis and transformation service. A user subscribes to the data analysis and transformation service and provides the data analysis and transformation service with user instructions setting forth actions to be performed on one or more artifacts in one or more source control systems. As described above, the user provides the data analysis and transformation service with instructions through a user interface (block 602). The controller receives the user instructions and sets up a user configuration for each user. A user may be the author of one or more artifacts, a project leader on a project that includes the artifact, a developer using the artifact, a reviewer of an artifact, and so on. The user may modify the user instructions or add other user instructions at any point in time and the controller updates the user's configuration accordingly.

The controller reads the user instructions and subscribes to the source control system for notification of the events that trigger the actions requested by the user (block 602). Alternatively, the controller may poll the source control system to determine whether or not the triggered event has occurred. In either way, the controller receives notification when an event has occurred (block 604).

Upon receipt of the notification, the controller instructs the acquisition manager to acquire the artifact file or files from one or more of the source control systems (block 606). The acquisition manager checks the artifact storage first to determine if the most current versions of the artifacts are currently stored in the data analysis and transformation engine (block 606). If the artifacts do not reside locally, the acquisition manager obtains the artifact file or files from the source control system. The artifact file or files may then be stored in the artifact storage (block 606).

Next, the controller initiates the actions associated with the event (blocks 608-616) until the actions associated with the event are completed (block 620—no). If a transformation or reformatting was requested (block 608—yes), then the controller instructs the transformation engine to perform the requested transformations (block 610). The transform engine obtains the artifact(s) from the artifact storage and performs the requested transformation on the artifacts in accordance with the user instructions (block 610). Upon completion of the transformation(s), the transform engine 210 stores the transformed artifacts into the artifact storage 216 and notifies the controller of the completion of the transformation (block 610).

If an analysis was requested (block 612—yes, block 608—no), then the controller instructs the analysis engine to perform the requested analysis (block 614). If an analysis was not requested (block 612—no) and a review was requested (block 616—yes), then the controller instructs the review engine to perform a review (block 618). When all the requested actions have been performed on the file or files (block 620—yes), then the controller instructs the push engine to check in the modified artifacts to one or more of the source control systems (block 622). This process repeats for each occurrence of an event specified in the user instructions.

Figure 7:
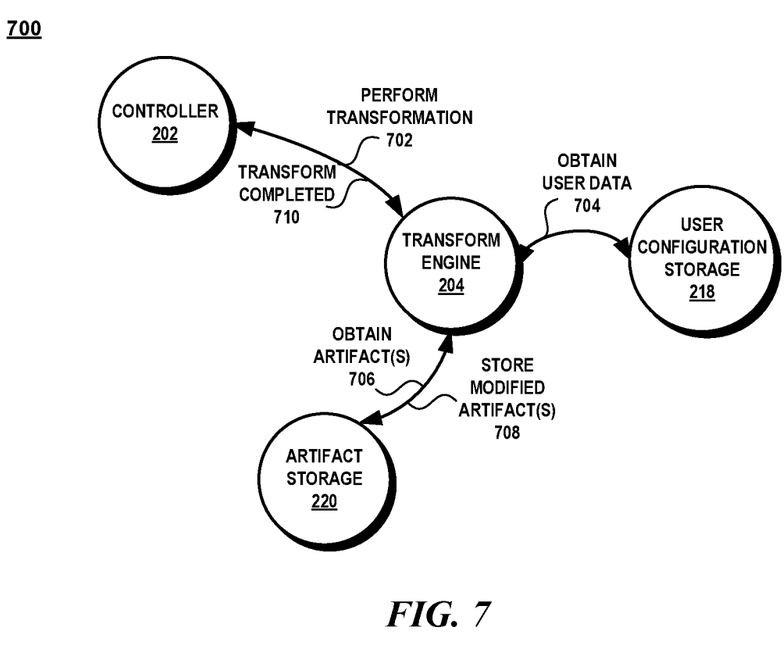
FIG. 7 is a diagram illustrating the actions of the transform engine.

Referring to FIG. 7, there is shown the operations of the transform engine 204 in further detail. The controller 202 instructs the transform engine 204 to perform a particular transformation (line 702). Upon notification from the controller 202, the transform engine 204 obtains the details of the transformation from the user configuration storage 218 and obtains 706 the artifacts from the artifact storage 220 (lines 704, 706). The transform engine 204 then performs the requested transformation on the artifacts in accordance with the user data and then stores the transformed artifacts into the artifact storage 220 (line 708). The controller is then notified of the completion of the transformation (line 710).

Figure 8:
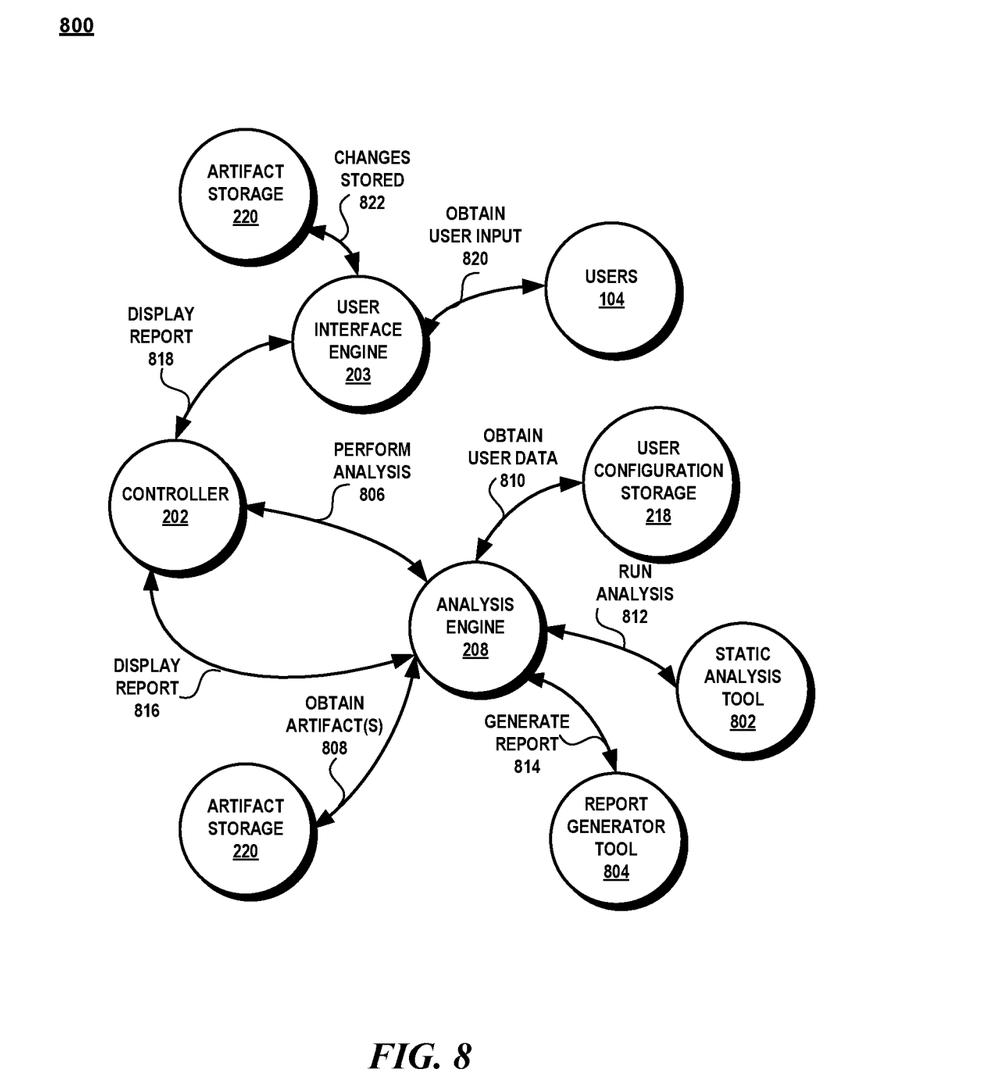
FIG. 8 is a diagram illustrating the actions of the analysis engine.

Referring to FIG. 8, there is shown the operations 800 of the analysis engine 208 in further detail. As noted above, the analysis engine 208 analyzes the artifacts for several conditions and provides the user with a report indicating these conditions. Additionally the report may indicate suggested corrections that the user may choose to be made.

The controller 202 instructs the analysis engine 208 to perform an analysis on an artifact (line 806). The analysis engine 208 obtains the user data (e.g., user instructions, rules, etc.) from the user configuration storage 218 (line 810) and the artifact from the artifact storage 220 (line 808). The analysis engine 208 utilizes a static analysis tool 802 to perform the analysis (line 812) and a report generator tool 804 to generate a report in accordance with the user instructions to detail the results of the analysis (line 814). The report may be transmitted to the users or reviewers instructed to review the report through the controller 202 who passes it to the user interface engine 203 which in turn passes the report to the appropriate users or reviewers (lines 816, 818). In the event the report requires input from the user 104, the user interface engine 203 obtains the user input (line 820). In the event, the user input requires changes to be made to the artifact, the user interface engine 203 makes the modifications and stores the modified artifact back to the artifact storage 220 (line 822).

Figure 9:
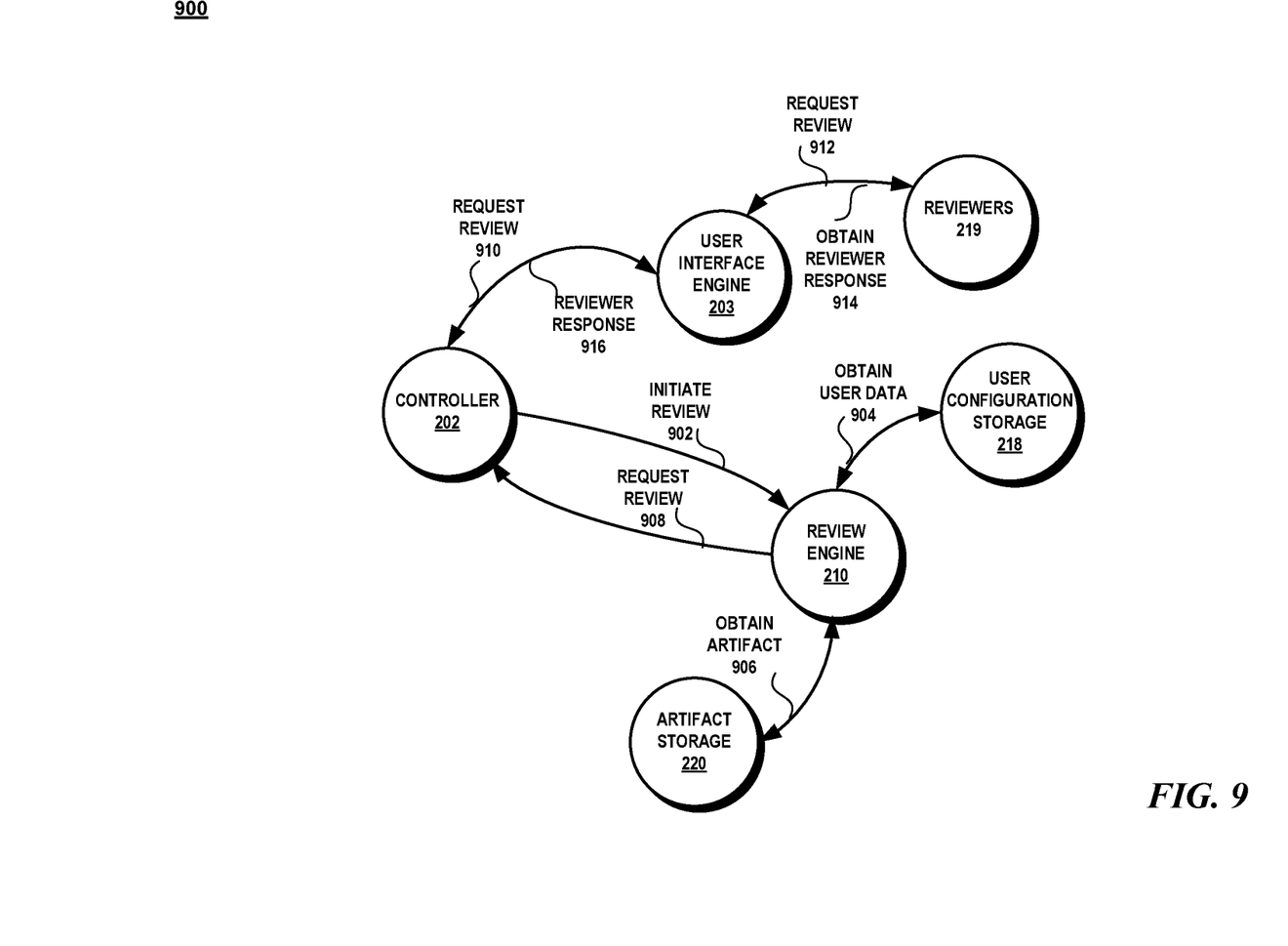
FIG. 9 is a diagram illustrating the actions of the review engine.

FIG. 9 illustrates the operations 900 of the review engine 210 in further detail. When a review is requested, either as part of a transformation, analysis or on its own, the controller 202 instructs the review engine 210 when to initiate the review (line 902). The review engine 210 obtains the user data having the user instructions from the user configuration storage 218 (line 904) and obtains the artifacts needed for the review from the artifact storage 220 (line 906). The review request and associated artifacts are passed to the reviewers 219 through the controller 202 and the user interface engine 202 (lines 908, 910, 912). The user interface engine 202 obtains the reviewer's response (line 914). and processes the response. The response may be to accept the current state of the artifact or to initiate a further format or analysis action.

In accordance with aspects of the subject matter described herein, a computer system can include at least one processor and a memory connected to the at least one processor. The at least one processor is configured to receive a plurality of user instructions that instruct the at least one processor to perform one or more actions on at least one artifact that is stored in a source control system. A user instruction may include an event that is associated with a change made to the at least one artifact. The one or more actions may include format, analyze, and/or review, wherein the action is performed on the at least one artifact after it has been changed and that change has been stored in the source control system.

Upon receipt of a notification from the source control system that an event associated with a format action has occurred, the at least one artifact is transformed in accordance with a predetermined format. Upon receipt of a notification from the source control system that an event associated with an analyze action has occurred, an analysis of the at least one artifact is performed to determine if an erroneous condition, such as a security flaw, a logic error, and/or a syntax error exists. Upon receipt of a notification from the source control system that an event associated with a review action occurred, a review of changes made to the at least one artifact is initiated.

The system may poll the source control system for notification of occurrence of an event or the system may request the source control system to notify the system of the occurrence of an event. The system may receive a changed artifact from the source control system, identify in the changed artifact one or more suggestions to correct an erroneous condition in the changed artifact and transmit the changed artifact including the one or more suggestions to a user. The system may receive user input in response to the one or more suggestions, modify the changed artifact in accordance with the received user input, and push the modified changed artifact back to the source control system.

A user instruction can include one or more reviewers to review changes made to an artifact as a result of a transformation action and/or a format action. When the one or more reviewers accept a change, the change may be made to the artifact and pushed back to the source control system.

A device can include at least one processor and a memory connected to the at least one processor. The device may include a user interface, a notification engine, an analysis engine, and a review engine. The user interface receives user instructions that direct the device to execute one or more actions on an artifact stored in a source control system. The user instructions include an event that occurs in the source control system and which triggers execution of the one or more actions. A notification engine determines when to initiate execution of an action based on occurrence of the event in the source control system. The analysis engine analyzes the artifact for potential errors that may have been introduced by a change to the artifact and generates a report that indicates whether or not an error exists and possibly a suggested correction for the potential error. A review engine initiates review of changes made to the artifact to one or more reviewers.

The device is separate from the source control system and they communicate via online transactions. The device also includes a transform engine, user interface engine, and push engine. The transform engine transforms the artifact in accordance with predetermined formatting rules. The review engine may initiate review of the transformed artifact and the user interface engine may accept changes to the transformed artifact made by the reviewers. A push engine commits changes made by the device to an artifact to the source control system.

A method of using a system and device, such as the system and device described above, can include operations such as receiving notification of an event occurring in at least one source control system wherein the event is associated with an action that is to be performed on a change made to an artifact that is stored in the at least one source control system. The action may include a format operation. Upon receiving notification of occurrence of the event, performing the format operation on the artifact and initiating a review of the formatted artifact to one or more reviewers. Upon confirmation of the formatted artifact by the one or more reviewers, push the formatted artifact back to the at least one source control system. The device and the at least one source control system communicate through online transactions.

The device receives input from the one or more reviewers to analyze the formatted artifact and that analysis is then performed. A report is generated based on the analysis of the formatted artifact which includes at least one suggested correction. The formatted artifact is changed to accept the suggested correction upon receipt of a user confirmation. The analysis of the formatted artifact may be to determine one or more conditions, such as a security flaw, a logic error, and/or a syntax error. The notification received by the device may be transmitted from one of a plurality of source control systems. The device may also receive a plurality of user instructions that indicate the event to be monitored and an action to be performed on an artifact upon occurrence of the event in a particular source control system.

Technical Effect

Aspects of the subject matter disclosed herein pertain to the technical problem of analyzing, reviewing, and transforming artifacts stored in one or more repositories in a more relevant and meaningful manner. The technical features associated with addressing this problem involve a data analysis and transformation service, that is separate from a source control system, and which enables a user to automatically analyze, review and transform changes to a collection of artifacts consistently across different source control systems from a central service without regard to the capabilities and functions that a particular source control system may offer. Accordingly, aspects of the disclosure exhibit technical effects with respect to a more efficient mechanism for analyzing the changes made to these artifacts that involve less computational resources and effort by the user.

Exemplary Operating Environment

Figure 10:
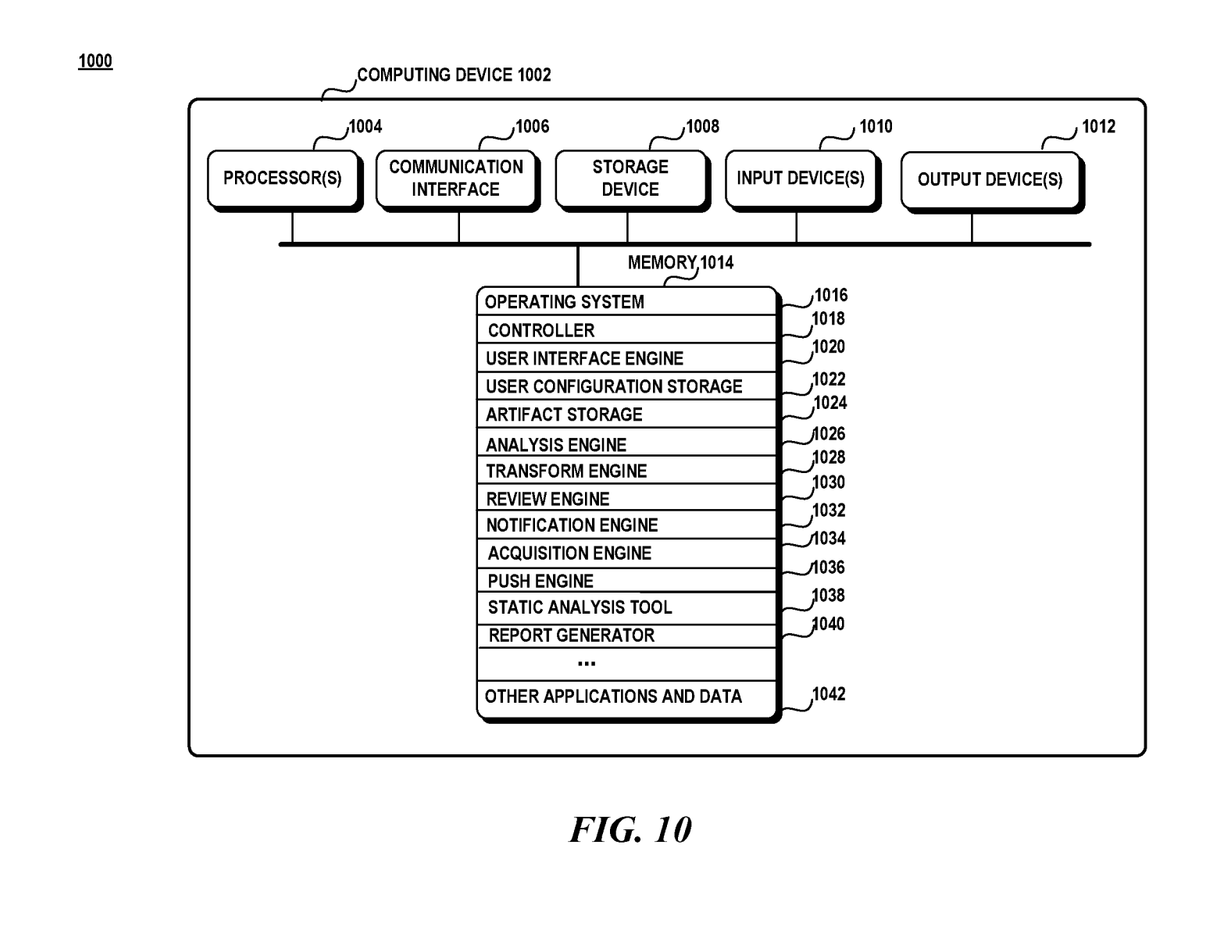
FIG. 10 is a block diagram illustrating an exemplary computing or operating environment.

Attention now turns to a discussion of an exemplary operating environment. It should be noted that the operating environment shown is exemplary and not intended to suggest any limitation as to the functionality of the aspects described herein. Turning to FIG. 10, the embodiments may be applied to an operating environment 1000 utilizing at least one computing device 1002. The computing device 1002 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1000 may be configured in a network environment, a distributed environment, a multi-processor environment, or a stand-alone computing device having access to remote or local storage devices.

The computing device 1002 may include one or more processors 1004, a communication interface 1006, a storage device 1008, one or more input devices 1010, one or more output devices 1012, and a memory 1014. A processor 1004 may be any commercially available processor and may include dual microprocessors and multi-processor architectures. The communication interface 1006 facilitates wired or wireless communications between the computing device 1002 and other devices. The storage device 1008 may be computer-readable medium that does not contain propagating signals, such as modulated data signals transmitted through a carrier wave. Examples of the storage device 1008 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1008 in the computing device 1002. The input devices 1010 may include a keyboard, mouse, pen, voice input device, touch input device, etc., and any combination thereof. The output devices 612 may include a display, speakers, printers, etc., and any combination thereof.

The memory 1014 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 1114 may also include one or more external storage devices or remotely located storage devices that do not pertain to propagated signals, such as modulated data signals transmitted through a carrier wave.

The memory 1014 may contain instructions, components, and data. A component is a software program that performs a specific function and is otherwise known as a module, program, application, and the like. The memory 1014 may include an operating system 1016, a controller 1018, a user interface engine 1020, a user configuration storage 1022, an artifact storage 1024, an analysis engine 1026, a transform engine 1028, a review engine 1030, a notification engine 1032, an acquisition engine 1034, a push engine 1036, a static analysis tool 1038, a report generator 1040, and other applications and data 1042.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
at least one processor and a memory;
one or more programs, wherein the one or more programs are stored in the memory and are configured to be executed by the at least one processor, the one or more programs including instructions that:
receive one or more user-defined actions that specify actions to be implemented to changes made to at least one artifact stored in a source control system;
monitor the source control system for an online transaction made to the source control system, the online transaction representing a change made to the at least one artifact;
upon receipt of a notification from the source control system of occurrence of an online transaction representing a change and wherein the one or more user-defined actions indicate reformatting a change to the at least one artifact, automatically obtaining the at least one artifact from the source control system and transforming the at least one artifact in accordance with a predetermined format;
upon receipt of a notification from the source control system of occurrence of an online transaction representing a change and wherein the one or more user-defined actions indicate an analysis of a change to the at least one artifact, automatically perform the analysis of the at least one artifact to determine if an erroneous condition associated with at least one of a security flaw, a logic error, and/or a syntax error exists in the at least one artifact; and
upon receipt of a notification from the source control system of occurrence of an online transaction representing a change and wherein the one or more user-defined actions indicate a review of a change to the at least one artifact, automatically initiate a review of the change made to the at least one artifact to one or more reviewers.

2. The system of claim 1, wherein the one or more programs include further instructions that:
poll the source control system to detect the online transaction.

3. The system of claim 1, wherein the one or more programs include further instructions that:
transmit a request to the source control system for notification of the online transaction.

4. The system of claim 1, wherein the one or more programs include further instructions that:
receive a changed artifact from the source control system;
identify in the changed artifact one or more suggestions to correct an error; and
transmit the changed artifact including the one or more suggestions to a user.

5. The system of claim 4, wherein the one or more programs include further instructions that:
receive user input in response to the one or more suggestions;
modify the changed artifact in accordance with the received user input; and
push the modified changed artifact back to the source control system.

6. The system of claim 1, wherein the one or more programs include further instructions that:
automatically push the changed artifact back to the source control system upon positive confirmation from the one or more reviewers.

7. The system of claim 1, wherein the one or more user-defined actions are performed on the at least one artifact in multiple source control systems.

8. The system of claim 1, wherein the one or more user-defined actions include one or more of a set of formatting styles to be used in reformatting the at least one artifact, a collection of rules specifying a set of analyzes to be performed on the at least one artifact, or the one or more reviewers that review the at least one artifact.

9. A device, comprising:
at least one processor and a memory;
wherein the at least one processor is configured to:
receive at least one user-defined action for an artifact stored in a source control system, the at least one user-defined action indicating when to automatically execute one or more actions on a change made to the artifact, the at least one user-defined action triggered by an online transaction that represents a change made to the artifact;
upon occurrence of a change to the artifact in the source control system and wherein the at least one user-defined action represents an analysis action, automatically triggering an analysis of the at least one artifact for one or more of security flaw, logic error, and/or syntax error and generating a report that indicates whether or not a potential error exists; and
upon occurrence of a change to the artifact in the source control system and wherein the at least one user-defined action represents a review action, automatically triggering a review of changes made to the artifact to one or more reviewers,
wherein the device is separate from the source control system.

10. The device of claim 9, wherein the device and the source control system communicate via online transactions.

11. The device of claim 9, wherein the at least one processor is further configured to:
upon occurrence of a change to the artifact and wherein the at least one user-defined action represents a reformat action, automatically triggering a reformat of changes made to the artifact.

12. The device of claim 11, wherein the at least one user-defined action including formatting rules.

13. The device of claim 11, wherein the at least one processor is further configured to:
accept changes to the artifact made by the one or more reviewers.

14. The device of claim 9, wherein the at least one processor is further configured to:
push changes to the artifact back to the source control system.

15. A method performed on a computing device having at least one processor and a memory, the method comprising:
receiving a notification of an online transaction representing an event occurring in at least one source control system, the event associated with an action to be performed on a change made to an artifact that is stored in the at least one source control system, the action including a reformat operation;
upon receipt of the notification of occurrence of the event, performing the reformat operation on the artifact;
initiating a review of the reformatted artifact to one or more reviewers; and
upon confirmation of the reformatted artifact by the one or more reviewers, push the reformatted artifact to the at least one source control system,
wherein the computing device and the at least source control system communicate through online transactions.

16. The method of claim 15, further comprising:
receiving input by the one or more reviewers to analyze the reformatted artifact; and
performing an analysis of the reformatted artifact.

17. The method of claim 16, further comprising:
generating a report based on the analysis of the reformatted artifact, the report including at least one suggested correction; and
modifying the reformatted artifact to accept the at least one suggested correction upon receipt of a user confirmation.

18. The method of claim 16, wherein the analysis analyzes the reformatted artifact for one or more conditions representing one of a security flaw, a logic error and/or a syntax error.

19. The method of claim 15, further comprising:
receiving user instructions specifying one or more other actions to be performed on one or more other artifacts in the at least one source control system, wherein the one or more actions includes one or more of format, analysis and/or review, wherein the one or more other actions is trigged by another event.

20. The method of claim 15, further comprising:
subscribing for occurrence of the event from the source control system.

* * * * *